(12) United States Patent
Aita et al.

(10) Patent No.: US 11,811,046 B2
(45) Date of Patent: Nov. 7, 2023

(54) METHOD FOR MANUFACTURING ELECTRODE

(71) Applicant: MUSASHI ENERGY SOLUTIONS CO., LTD., Hokuto (JP)

(72) Inventors: Kazunari Aita, Minato-ku (JP); Masaya Naoi, Minato-ku (JP); Kenji Kojima, Minato-ku (JP); Masahiro Yamamoto, Hokuto (JP)

(73) Assignee: MUSASHI ENERGY SOLUTIONS CO., LTD., Hokuto (JP)

( * ) Notice: Subject to any disclaimer, the term of this patent is extended or adjusted under 35 U.S.C. 154(b) by 0 days.

(21) Appl. No.: 17/780,346

(22) PCT Filed: Aug. 18, 2020

(86) PCT No.: PCT/JP2020/031148
§ 371 (c)(1),
(2) Date: May 26, 2022

(87) PCT Pub. No.: WO2021/106286
PCT Pub. Date: Jun. 3, 2021

(65) Prior Publication Data
US 2023/0022630 A1 Jan. 26, 2023

(30) Foreign Application Priority Data
Nov. 28, 2019 (JP) .................................. 2019-215237

(51) Int. Cl.
*H01M 4/139* (2010.01)
*H01M 4/04* (2006.01)
(Continued)

(52) U.S. Cl.
CPC .......... *H01M 4/0459* (2013.01); *H01G 11/06* (2013.01); *H01G 11/86* (2013.01); *H01M 4/139* (2013.01)

(58) Field of Classification Search
CPC ..... H01G 11/06; H01G 11/86; H01M 4/0459; H01M 4/139
See application file for complete search history.

(56) References Cited

U.S. PATENT DOCUMENTS

2019/0074143 A1\* 3/2019 Naoi ..................... H01M 4/139

FOREIGN PATENT DOCUMENTS

| CN | 108701553 | 10/2018 |
| JP | 10-308212 | \* 11/1998 |

(Continued)

OTHER PUBLICATIONS

First Patent Examination Opinion dated Jun. 20, 2023, in Chinese patent application No. 202080082588.3, with English translation, (12 pages).

*Primary Examiner* — Tabassom Tadayyon Eslami
(74) *Attorney, Agent, or Firm* — Oblon, McClelland, Maier & Neustadt, L.L.P.

(57) ABSTRACT

Provided is a method for manufacturing an electrode by doping an active material included a layer of an electrode precursor with alkali metal. The electrode precursor and a counter electrode member are brought into contact with a solution containing an alkali metal ion in a dope bath. The counter electrode member includes a conductive base material, an alkali metal-containing plate, and a member having an opening. The member having the opening is located between the conductive base material and the alkali metal-containing plate. The member having the opening is, for example, a resin film having an opening.

6 Claims, 10 Drawing Sheets

(51) Int. Cl.
*H01G 11/06* (2013.01)
*H01G 11/86* (2013.01)

(56) References Cited

FOREIGN PATENT DOCUMENTS

| | | |
|---|---:|---:|
| JP | 10-308212 A | 11/1998 |
| JP | 2005-123175 A | 5/2005 |
| JP | 2006-107795 A | 4/2006 |
| JP | 2006134785 | 5/2006 |
| JP | 2008-77963 A | 4/2008 |
| JP | 2009-246137 A | 10/2009 |
| JP | 2012-49543 A | 3/2012 |
| JP | 2012-49544 A | 3/2012 |
| JP | 2013-258392 A | 12/2013 |

* cited by examiner

METHOD FOR MANUFACTURING ELECTRODE

CROSS-REFERENCE TO RELATED APPLICATION

This international application claims the benefit of Japanese Patent Application No. 2019-215237 filed on Nov. 28, 2019 with the Japan Patent Office, and the entire disclosure of Japanese Patent Application No. 2019-215237 is incorporated herein by reference.

TECHNICAL FIELD

The present disclosure relates to a method for manufacturing an electrode.

BACKGROUND ART

Electronic devices have been remarkably downsized and light-weighted in recent years. As a result of the downsizing and light-weighting of the electronic devices, there are further increasing demands for also downsizing and light-weighting power storage devices used as power sources for driving the electronic devices.

As the power storage devices satisfying such demands for downsizing and light-weighting, non-aqueous electrolyte rechargeable batteries represented by lithium ion rechargeable batteries have been developed. In addition, lithium ion capacitors have been known as power storage devices adapted for applications that require high energy density characteristics and high output characteristics. Furthermore, sodium ion type batteries and sodium ion type capacitors have also been known for using sodium that is lower in cost and abundant in resources than lithium.

In such batteries and capacitors, a process to dope an electrode with an alkali metal beforehand is adopted for various purposes (generally this process is referred to as pre-doping). Examples of the method to pre-dope the electrode with the alkali metal may include a continuous method. In the continuous method, pre-doping is performed while a belt-like shaped electrode is transported in a dope solution. The continuous method is disclosed in Patent Documents 1-4.

PRIOR ART DOCUMENTS

Patent Documents

Patent Document 1: Japanese Unexamined Patent Application Publication No. H10-308212
Patent Document 2: Japanese Unexamined Patent Application Publication No. 2008-77963
Patent Document 3: Japanese Unexamined Patent Application Publication No. 2012-49543
Patent Document 4: Japanese Unexamined Patent Application Publication No. 2012-49544

SUMMARY OF THE INVENTION

Problems to be Solved by the Invention

In pre-doping, a counter electrode member is used. The counter electrode member is usually prepared by stacking a conductive base material and an alkali metal-containing plate followed by pressing. As pre-doping is repeatedly performed, the thickness of the alkali metal-containing plate decreases. Thus, when the thickness of the alkali metal-containing plate decreases, it is necessary to peel the alkali metal-containing plate from the conductive base material to replace it with a new alkali metal-containing plate.

However, since the conductive base material and the alkali metal-containing plate are strongly adhered, it has been difficult to peel the alkali metal-containing plate from the conductive base material.

In one aspect of the present disclosure, it is preferable to provide a method for manufacturing an electrode, wherein it is easy to peel the alkali metal-containing plate from the conductive base material.

Means for Solving the Problems

One aspect of the present disclosure is a method for manufacturing an electrode by doping an active material included in a layer of an electrode precursor with alkali metal, the method including bringing the electrode precursor and a counter electrode member into contact with a solution containing an alkali metal ion in a dope bath, wherein the counter electrode member includes a conductive base material, an alkali metal-containing plate, and a member having an opening, the member being located between the conductive base material and the alkali metal-containing plate.

In the method for manufacturing the electrode, which is one aspect of the present disclosure, the counter electrode member includes a member having an opening. The member having the opening is located between the conductive base material and the alkali metal-containing plate. Thus, it is easy to peel the alkali metal-containing plate from the conductive base material.

EXPLANATION OF REFERENCE NUMERALS

1 . . . electrode, 3 . . . current collector, 5 . . . active material layer, 11 . . . electrode manufacturing system, 15 . . . electrolyte solution treatment bath, 17, 19, 21 . . . dope bath, 23 . . . cleaning bath, 25, 27, 29, 31, 33, 35, 37, 37, 40, 41, 43, 45, 46, 47, 49, 51, 52, 53, 55, 57, 58, 59, 61, 63, 64, 65, 67, 69, 70, 71, 73, 75 . . . conveyor roller, 100 . . . dope solution, 101 . . . supply roll, 103 . . . wind-up roll, 105 . . . supporting table, 107 . . . circulation filtration unit, 109, 110, 111, 112, 113, 114 . . . power source, 117 . . . tab cleaner, 119 . . . collection unit, 121 . . . end sensor, 123, 135 . . . partition plate, 125, 127, 145, 147 . . . supporting rod, 131 . . . upstream bath, 133 . . . downstream bath, 137, 139, 141, 143 . . . counter electrode member, 149, 151 . . . space, 153 . . . conductive base material, 154 . . . opening member, 155 . . . alkali metal-containing plate, 157 . . . porous insulating member, 161 . . . filter, 163 . . . pump, 165 . . . piping, 171 . . . opening, 173 . . . first filament, 175 . . . second filament, 177 . . . first measuring terminal, 179 . . . second sense terminal, 181 . . . interface, 253 . . . copper plate, 254 . . . resin film, 255 . . . Li foil

MODE FOR CARRYING OUT THE INVENTION

Example embodiments of the present disclosure will be described with reference to the drawings.

First Embodiment

1. Configurations of Electrode 1 and Electrode Precursor

Figure 1:
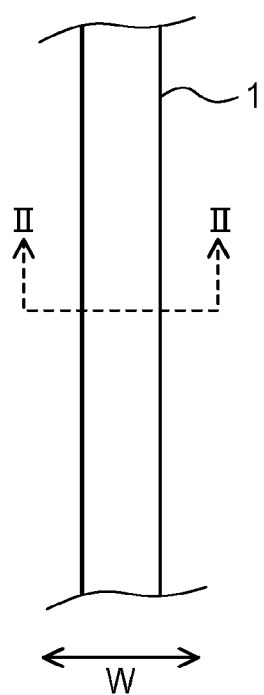
FIG. 1 is a plan view showing configuration of an electrode.
Figure 2:
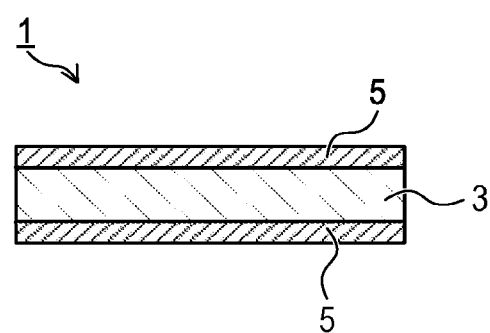
FIG. 2 is a sectional view showing a cross section cut along a line II-II in FIG. 1.

A configuration of an electrode 1 will be described based on FIG. 1 and FIG. 2. The electrode 1 has a strip shape. The electrode 1 includes a current collector 3 and an active material layer 5. The current collector 3 has a strip shape. The active material layer 5 is formed on each side of the current collector 3.

The current collector 3 is preferably a metal foil formed of, for example, copper, nickel, or stainless steel. The current collector 3 may include a conductive layer that is composed primarily of a carbon material and that is formed on the metal foil. The current collector 3 has a thickness of, for example, 5 to 50 µm.

The active material layer 5 can be produced by, for example, applying a slurry including an active material and a binder on the current collector 3, followed by drying.

Examples of the binder may include a rubber binder, such as styrene-butadiene rubber (SBR) and NBR; a fluorinated resin, such as polytetrafluoroethylene and polyvinylidene fluoride; polypropylene, polyethylene, and a fluorine modified (meta) acrylic-based binder as disclosed in JP 2009-246137A.

The slurry may contain other components in addition to the active material and the binder. Examples of other components may include a conductive agent and a thickener. Examples of the conductive agent may include carbon black, black lead, vapor growth carbon fiber, and metallic powder. Examples of the thickener may include carboxylmethylcellulose, Na salt or ammonium salt, methyl cellulose, hydroxymethylcellulose, ethylcellulose, hydroxypropyl cellulose, polyvinyl alcohol, oxidized starch, phosphorylated starch, and casein.

The thickness of the active material layer 5 is not particularly limited. The thickness of the active material layer 5 is, for example, 5 to 500 µm, preferably 10 to 200 µm, and particularly preferably 10 to 100 µm. The electrode active material contained in the active material layer 5 is not limited if the active material is applicable to a battery or a capacitor that uses insertion and desorption of an alkali metal ion. The active material may be a negative electrode active material or a positive electrode active material.

The negative electrode active material is not particularly limited. Examples of the negative electrode active material may include a carbon material. Examples of the negative electrode active material may include a metal or a semimetal, such as Si and Sn that can be alloyed with lithium, or a material containing oxides thereof. Examples of the carbon material may include graphite, easily-graphitizable carbon, hardly-graphitizable carbon, and a composite carbon material. The composite carbon material is a material in which a graphite particle is coated with a carbide of pitch and/or resin. Specific examples of the carbon material may include a carbon material disclosed in JP 2013-258392. Specific examples of the metal or the semimetal that can be alloyed with lithium, or a material containing oxide thereof may include materials disclosed in JP 2005-123175A and JP 2006-107795A.

Examples of the positive electrode active material may include a transition metal oxide and a sulfur-based active material. Examples of the transition metal oxide may include a cobalt oxide, a nickel oxide, a manganese oxide, and a vanadium oxide. Examples of the sulfur-based active material may include a simple sulfur substance and a metal sulfide. Both of the positive electrode active material and the negative electrode active material may be formed of a single substance or a mixture of two or more substances.

The active material contained in the active material layer 5 is pre-doped with an alkali metal using an electrode manufacturing system 11 described below. The alkali metal with which the active material is pre-doped may be preferably lithium or sodium, and particularly preferably lithium. When the electrode 1 is used to manufacture an electrode of the lithium ion rechargeable battery, the density of the active material layer 5 is preferably 1.00 to 2.00 g/cc, particularly preferably 1.10 to 1.60 g/cc.

The electrode precursor is the one which has basically the same configuration as the electrode, but in which the active material is not doped with the alkali metal.

2. Configuration of Electrode Manufacturing System 11

Figure 3:
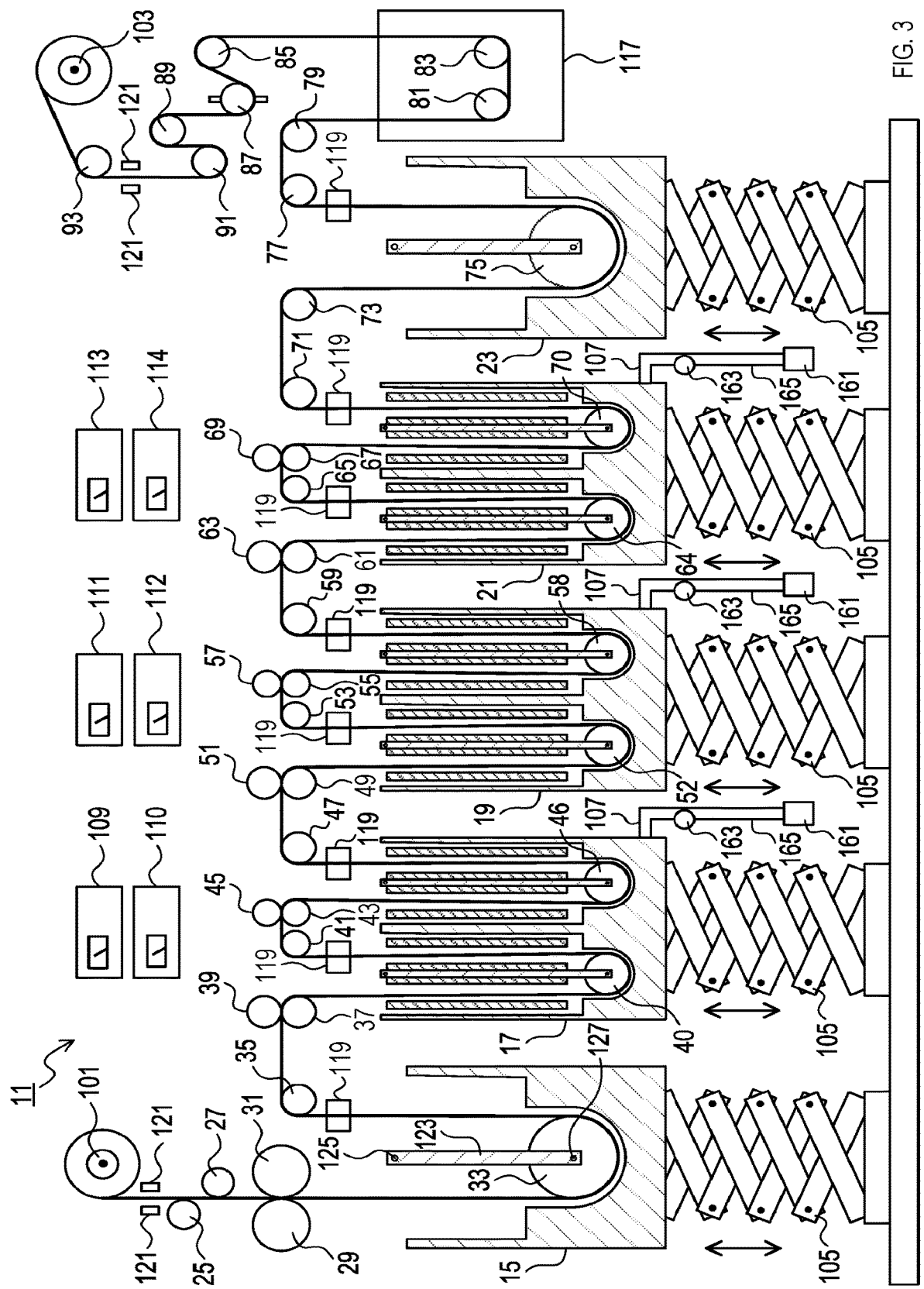
FIG. 3 is an explanatory diagram showing a configuration of an electrode manufacturing system.
Figure 4:
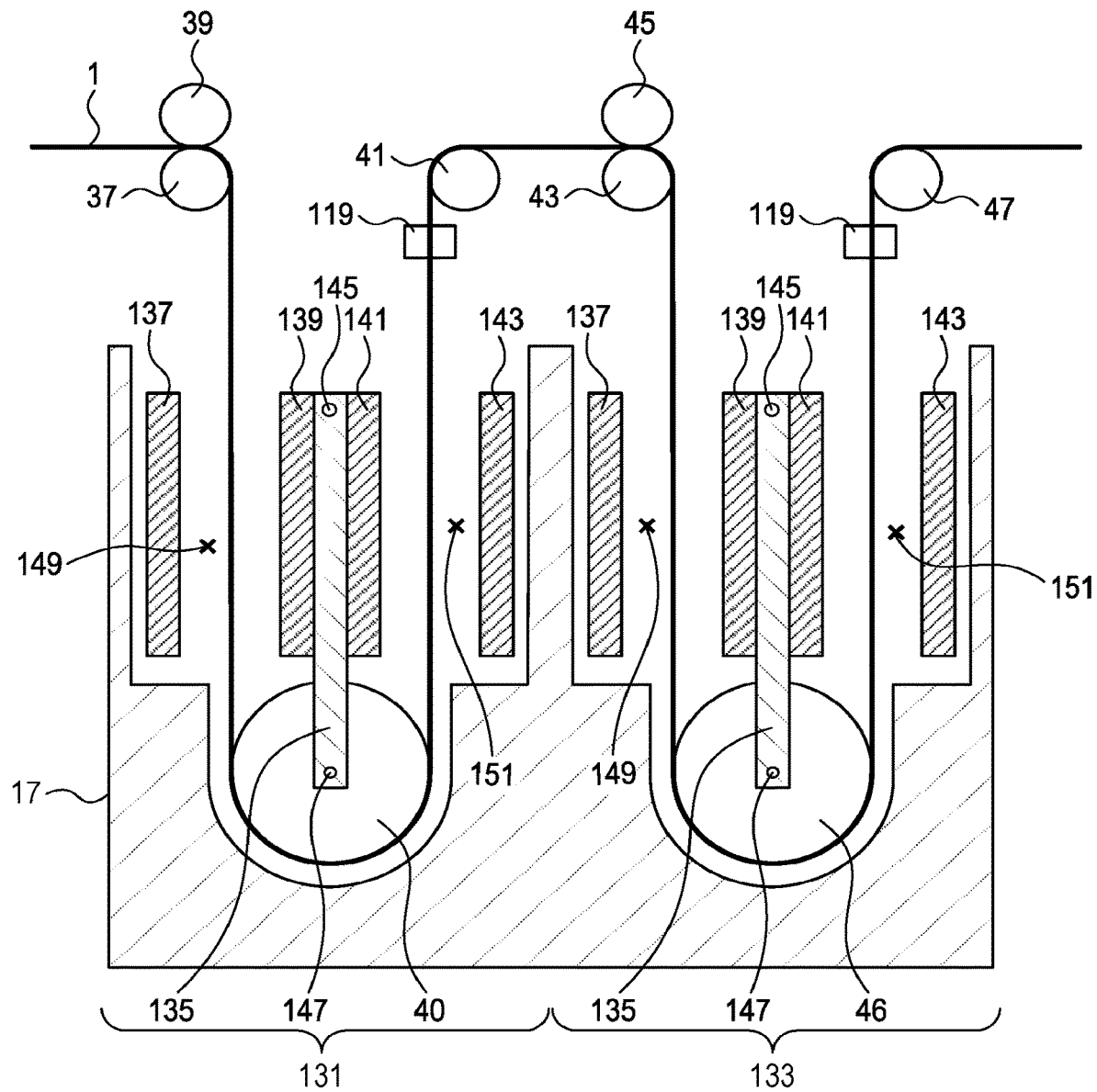
FIG. 4 is an explanatory diagram showing a configuration of a dope bath.
Figure 5:
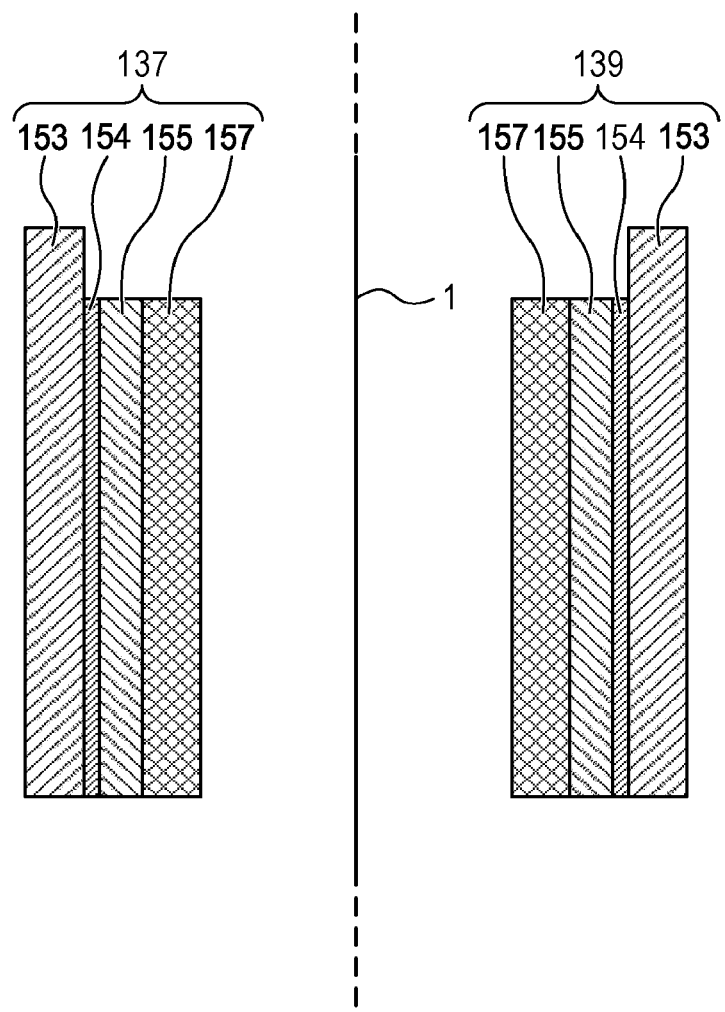
FIG. 5 is an explanatory diagram showing a configuration of counter electrode members.

The configuration of the electrode manufacturing system 11 will be described based on FIG. 3 to FIG. 5. As shown in FIG. 3, the electrode manufacturing system 11 includes an electrolyte solution treatment bath 15, dope baths 17, 19, 21, a cleaning bath 23, conveyor rollers 25, 27, 29, 31, 33, 35, 37, 39, 40, 41, 43, 45, 46, 47, 49, 51, 52, 53, 55, 57, 58, 59, 61, 63, 64, 65, 67, 69, 70, 71, 73, 75, 77, 79, 81, 83, 85, 87, 89, 91, 93 (hereinafter they may be collectively referred to as a conveyer roller group, a supply roll 101, a wind-up roll 103, supporting tables 105, circulation filtration sections 107, six power sources 109, 110, 111, 112, 113, 114, a tab cleaner 117, a collection section 119, and end sensors 121.

The electrolyte solution treatment bath 15 is a rectangular tank with an open top. The electrolyte solution treatment bath 15 has a bottom surface having a substantially U-shaped cross-sectional shape. The electrolyte solution treatment bath 15 includes a partition plate 123. The partition plate 123 is supported by a supporting rod 125 penetrating the upper end thereof. The supporting rod 125 is fixed to a wall or the like that is not shown. The partition plate 123 extends vertically and divides the interior of the electrolyte solution treatment bath 15 into two spaces. The electrode 1 is sufficiently impregnated with the electrolyte solution by passing through this electrolyte solution treatment bath 15. This makes it easier for the electrode 1 to be pre-doped in the dope baths 17, 19, 21.

The partition plate 123 has the conveyor roller 33 attached to the bottom end thereof. The partition plate 123 and the conveyor roller 33 are supported by a supporting rod 127 penetrating them. The partition plate 123 is notched in the vicinity of the bottom end thereof so as not to contact the conveyor roller 33. There is a space between the conveyor roller 33 and the bottom surface of the electrolyte solution treatment bath 15.

The configuration of the dope bath 17 will be described based on FIG. 4. The dope bath 17 includes an upstream bath 131 and a downstream bath 133. The upstream bath 131 is arranged on a supply roll 101 side (hereinafter, referred to as an upstream side), the downstream bath 133 is arranged on a wind-up roll 103 side (hereinafter, referred to as a downstream side).

First, a configuration of the upstream bath 131 will be described. The upstream bath 131 is a square tank with an open top. The upstream bath 131 has a bottom surface having a substantially U-shaped cross-sectional shape. The upstream bath 131 includes a partition plate 135 and four counter electrode members 137, 139, 141, 143.

The partition plate 135 is supported by a supporting rod 145 penetrating the upper end thereof. The supporting rod 145 is fixed to a wall or the like that is not shown. The partition plate 135 extends vertically and divides the interior of the upstream bath 131 into two spaces. The conveyor roller 40 is attached to the bottom end of the partition plate 135. The partition plate 135 and the conveyor roller 40 are supported by a supporting rod 147 penetrating them. The partition plate 135 is notched in the vicinity of the bottom end thereof so as not to be in contact with the conveyor roller 40. There is a space between the conveyor roller 40 and the bottom surface of the upstream bath 131.

The counter electrode member 137 is arranged on the upstream side in the upstream bath 131. The counter electrode members 139, 141 are arranged so as to hold the partition plate 135 from both sides. The counter electrode member 143 is arranged on the downstream side in the upstream bath 131.

There is a space 149 between the counter electrode member 137 and counter electrode member 139. There is a space 151 between the counter electrode member 141 and the counter electrode member 143. The counter electrode members 137, 139, 141, 143 are connected to one electrode of the power source 109. The counter electrode members 137, 139, 141, 143 have similar configurations. Here, based on FIG. 5, the configurations of the counter electrode members 137, 139 will be described.

The counter electrode members 137, 139 each have a configuration in which a conductive base material 153, an alkali metal-containing plate 155, and a porous insulating member 157 are stacked. The opening member 154 is located between the conductive base material 153 and the alkali metal-containing plate 155. The counter electrode members 137, 139 do not necessarily include the porous insulating members 157. Examples of a material of the conductive base material 153 may include copper, stainless steel, and nickel.

The counter electrode members 137, 139 may each include a resin mask covering an end of the alkali metal-containing plate 155. Examples of a resin forming the resin mask may include polyethylene, polypropylene, nylon, polyetheretherketone, and polytetrafluoroethylene. The resin mask inhibits that a current density becomes excessively high in the edge of the active material layer 5. As a result, it becomes easier to dope a specified portion of the active material layer 5 with the alkali metal.

A surface of the resin mask facing the electrode 1 is referred to as a resin mask surface. A distance from the resin mask surface to the electrode 1 is preferably, for example, 1 to 10 mm, and more preferably 1 to 3 mm.

Figure 6:
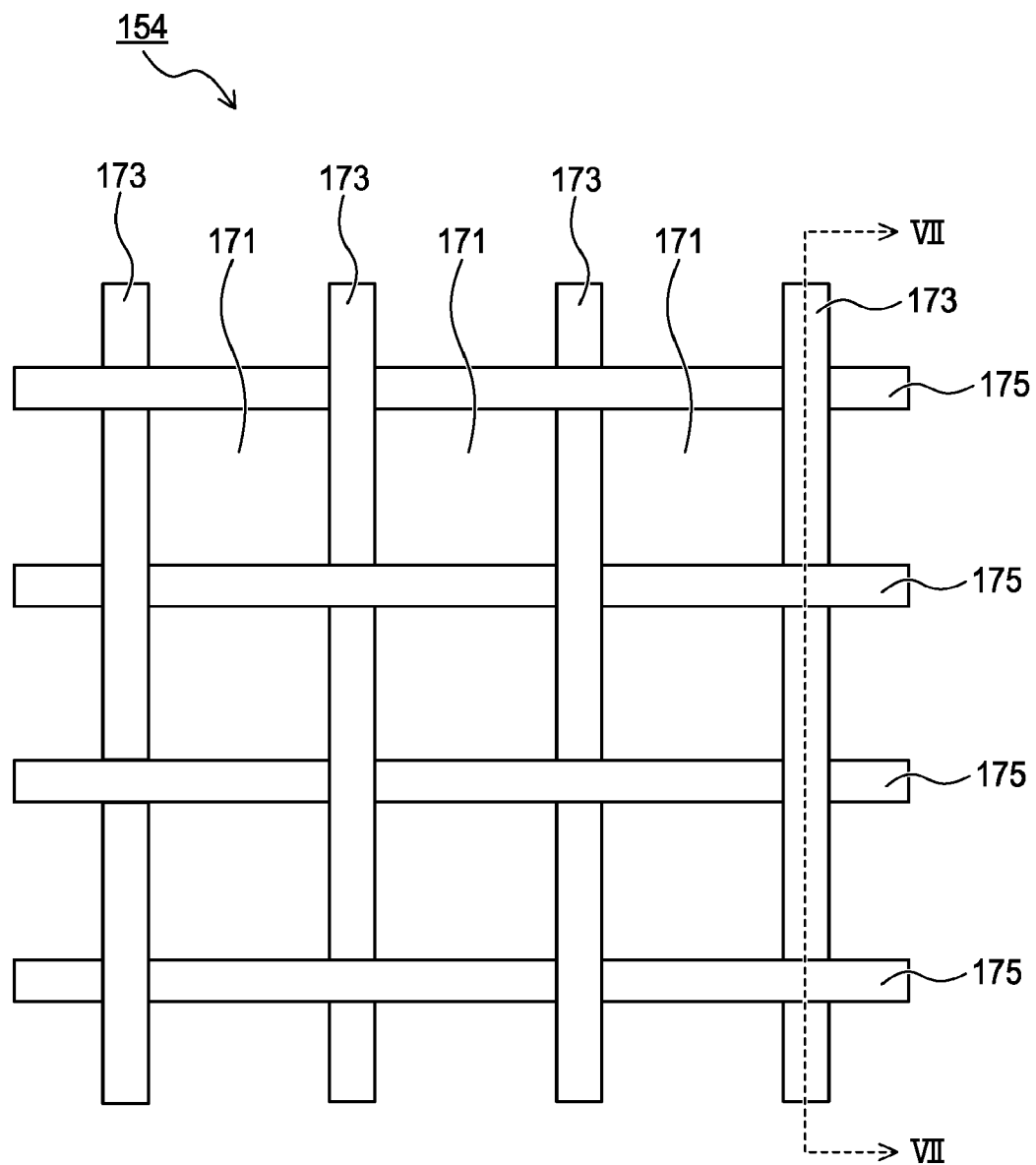
FIG. 6 is a plan view showing a configuration of an opening member.

The opening member 154 basically has a grid shape. When the opening member 154 has a grid shape, it becomes even easier to peel the alkali metal-containing plate 155 from the conductive base material 153. As shown in FIG. 6, the opening member 154 includes an opening 171. The opening 171 penetrates through the opening member 154 in a thickness direction. The opening member 154 includes, for example, multiple openings 171. The opening member 154 is, for example, a resin film. Examples of a resin forming the resin film includes polyethylene, polypropylene, nylon, polyetheretherketone, and polytetrafluoroethylene. Alternatively, the opening member 154 may be formed of a porous metal. Examples of the porous metal may include porous nickel and porous titanium.

Figure 7:
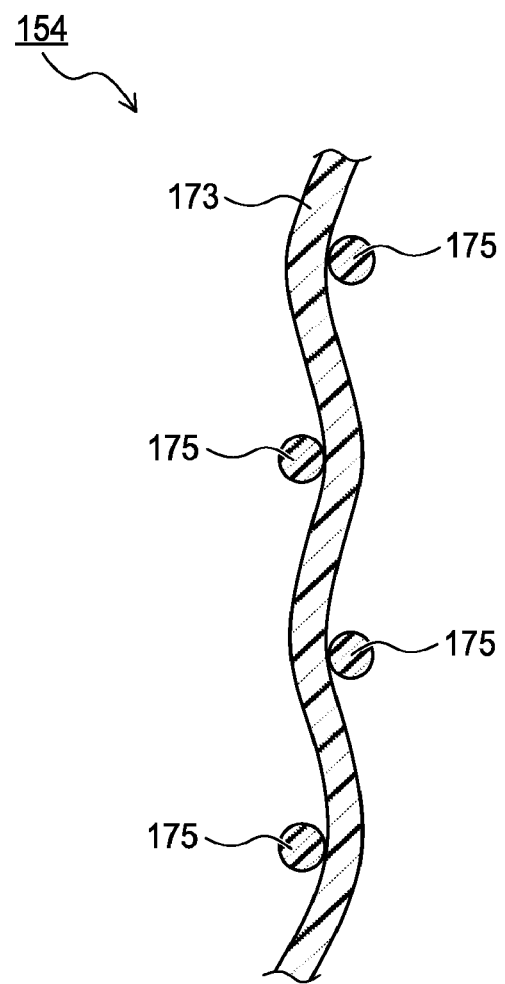
FIG. 7 is a sectional view showing a cross section cut along a line VII-VII in FIG. 6.

The opening member 154 has, for example, a grid shape as shown in FIG. 6 and FIG. 7. The grid-shaped opening member 154 is formed by first filaments 173 and second filaments 175. The first filaments 173 are arranged in parallel at regular intervals. The second filaments 175 are arranged in parallel at regular intervals. The first filament 173 and the second filament 175 are, for example, perpendicular to each other. The intersection of the first filament 173 and the second filament 175 is, for example, welded.

The opening member 154 may be, for example, a plate-shaped member with holes. The holes correspond to the openings. The holes each have a circular shape, for example. An arrangement pattern of the holes is, for example, a staggered pattern.

The opening member 154 has an aperture ratio of, for example, 2% or higher and 85% or lower. The aperture ratio is defined as follows. A given range A is specified in the opening member 154. The area of the range A is assumed S1 on the assumption that the opening member 154 does not have the openings. The total area of the openings in the range A is assumed S2. The aperture ratio is given by (S2/S1)×100. When the aperture ratio is 2% or higher, it is possible to inhibit an increase in electrical resistance between the conductive base material 153 and the alkali metal-containing plate 155. When the aperture ratio is 85% or lower, it becomes even easier to peel the alkali metal-containing plate 155 from the conductive base material 153.

The thickness of the opening member 154 is, for example, 10 μm or more and 2000 μm or less, and preferably 25 μm or more and 1000 μm or less. When the thickness is 10 μm or more, it becomes even easier to peel the alkali metal-containing plate 155 from the conductive base material 153. When the thickness is 2000 μm or less, it is possible to inhibit the increase in electrical resistance between the conductive base material 153 and the alkali metal-containing plate 155.

The form of the alkali metal-containing plate 155 is not particularly limited, and examples thereof may include an alkali metal plate and an alkali metal alloy plate. The alkali metal-containing plate 155 has a thickness of, for example, 0.03 to 20 mm, and preferably 1 to 15 mm. In FIG. 5, a distance between the electrode 1 and the alkali metal-containing plate 155 is preferably 1 to 30 mm, and more preferably 3 to 20 mm.

The porous insulating member 157 has a plate shape. The porous insulating member 157 is stacked on the alkali metal-containing plate 155. The plate shape of the porous insulating member 157 is a shape when the porous insulating member 157 is stacked on the alkali metal-containing plate 155. The porous insulating member 157 may be a member maintaining a specified shape by itself, or may be a member easily deformable, such as nets.

The porous insulating member 157 is porous. Thus, the dope solution described below can pass through the porous insulating member 157. This enables the alkali metal-containing plate 155 to be in contact with the dope solution.

Examples of the porous insulating member 157 may include a resin mesh. Examples of the resin may include polyethylene, polypropylene, nylon, polyetheretherketone, and polytetrafluoroethylene. The opening of the mesh can be appropriately set. The opening of the mesh is, for example, 0.1 μm to 10 mm, and preferably 0.1 to 5 mm. The thickness of the mesh can be appropriately set. The opening of the mesh is, for example, 1 μm to 10 mm, and preferably 30 μm to 1 mm. The aperture ratio of the mesh can be appropriately set. The aperture ratio of the mesh is, for example, 5 to 98%, preferably 5 to 95%, and more preferably 50 to 95%.

The porous insulating member 157 may be entirely formed of an insulating material, or may partially include an insulating layer.

The downstream bath 133 has basically the same configuration as the upstream bath 131. However, the downstream bath 133 includes a conveyor roller 46 inside thereof, instead of the conveyor roller 40. The counter electrode members 137, 139, 141, 143 included in the downstream bath 133 are connected to one electrode of the power source 110.

The dope bath 19 has basically the same configuration as the dope bath 17. However, the dope bath 19 includes conveyor rollers 52, 58 inside thereof, instead of the conveyor rollers 40, 46. The counter electrode members 137, 139, 141, 143 included in the upstream bath 131 of the dope bath 19 are connected to one electrode of the power source 111. The counter electrode members 137, 139, 141, 143 included in the downstream bath 133 of the dope bath 19 are connected to one electrode of the power source 112.

The dope bath 21 has basically the same configuration as the dope bath 17. However, the dope bath 21 includes conveyor rollers 64, 70 inside thereof, instead of the conveyor rollers 40, 46. The counter electrode members 137, 139, 141, 143 included in the upstream bath 131 of the dope bath 21 are connected to one electrode of the power source 113. The counter electrode members 137, 139, 141, 143 included in the downstream bath 133 of the dope bath 21 are connected to one electrode of the power source 114.

The cleaning bath 23 has basically the same configuration as the electrolyte solution treatment bath 15. However, cleaning bath 23 includes a conveyor roller 75 inside thereof, instead of the conveyor roller 33.

In the conveyer roller group, the conveyor rollers 37, 39, 43, 45, 49, 51, 55, 57, 61, 63, 67, 69 are formed of an electrically conductive material. In the conveyor roller group, other conveyor rollers are formed of an elastomer except for a bearing portion. The conveyer roller group conveys the electrode precursor and the electrode 1 along a specified path. The path that the conveyer roller group conveys the electrode precursor and the electrode 1 extends from the supply roll 101, passes through the electrolyte solution treatment bath 15, the dope bath 17, the dope bath 19, the dope bath 21, the cleaning bath 23, and the tab cleaner 117 in this order and reaches the wind-up roll 103.

A portion of the path passing through the electrolyte solution treatment bath 15 first runs downward by the conveyor rollers 29, 31, and is directed upward by the conveyor roller 33.

A portion of the above described path passing through the dope bath 17 is as follows. First, the path is directed downward by the conveyor roller 37, and runs downward in the space 149 of the upstream bath 131. Then, the path is directed upward by the conveyor roller 40 and runs upward in the space 151 of the upstream bath 131. Then, the path is directed downward by the conveyor rollers 41, 43 and runs downward in the space 149 of the downstream bath 133. Then, the path is directed upward by the conveyor roller 46 and runs upward in the space 151 of the downstream bath 133. Finally, the path is directed horizontally by the conveyor roller 47 and runs toward the dope bath 19.

A portion of the above described path passing through the dope bath 19 is as follows. First, the path is directed downward by the conveyor roller 49 and runs downward in the space 149 of the upstream bath 131. Then, the path is directed upward by the conveyor roller 52 and runs upward in the space 151 of the upstream bath 131. Then, the path is directed downward by the conveyor roller 53, 55 and runs downward in the space 149 of the downstream bath 133. Then, the path is directed upward by the conveyor roller 58 and runs upward in the space 151 of the downstream bath 133. Finally, the path is directed horizontally by the conveyor roller 59 and runs toward the dope bath 21.

A portion of the above described path passing through the dope bath 21 is as follows. First, the path is directed downward by the conveyor roller 61 and runs downward in the space 149 of the upstream bath 131. Then, the path is directed upward by the conveyor roller 64 and runs upward in the space 151 of the upstream bath 131. Then, the path is directed downward by the conveyor rollers 65, 67 and runs downward in the space 149 of the downstream bath 133. Then, the path is directed upward by the conveyor roller 70 and runs upward in the space 151 of the downstream bath 133. Finally, the path is directed horizontally by the conveyor roller 71 and runs toward the cleaning bath 23.

A portion of the above described path passing through the cleaning bath 23 is a path that is first directed downward by the conveyor roller 73 to run downward, and then directed upward by the conveyor roller 75.

The supply roll 101 winds up and keeps the electrode precursor. That is, the supply roll 101 holds the electrode precursor in a wound state. The active material in the electrode precursor held around the supply roll 101 is not yet doped with the alkali metal.

The conveyer roller group draws the electrode precursor held by the supply roll 101 and conveys it. The electrode precursor is pre-doped in the dope baths 17, 19, 21 and becomes the electrode 1. The wind-up roll 103 winds up and stores the electrode 1 conveyed by the conveyer roller group. The active material in the electrode 1 stored by the wind-up roll 103 is doped with the alkali metal.

The supporting table 105 supports the electrolyte solution treatment bath 15, the dope baths 17, 19, 21 and the cleaning bath 23 from below. The supporting table 105 is height adjustable. The circulation filtration unit 107 is provided to each of the dope baths 17, 19, 21. The circulation filtration unit 107 includes a filter 161, a pump 163, and a piping 165.

In the circulation filtration unit 107 provided to the dope bath 17, the piping 165 is a circulation pipe that extends from the dope bath 17, passes through the pump 163 and the filter 161 sequentially in this order, and returns to the dope bath 17. The dope solution in the dope bath 17 circulates through the piping 165 and the filter 161 and returns to the dope bath 17 again by driving force of the pump 163. At this time, the foreign matters and the like in the dope solution are filtered by the filter 161. Examples of the foreign matters may include a foreign matter precipitated from the dope solution and a foreign matter arisen from the electrode 1. Examples of a material of the filter 161 may include a resin such as polypropylene and polytetrafluoroethylene. The pore size of the filter 161 may be appropriately set. The pore size of the filter 161 is, for example, 0.2 to 50 μm.

The circulation filtration unit 107 provided to each of the dope baths 19, 21 also has a similar configuration and exerts similar functions and effects. In FIG. 3, FIG. 4, the illustration of the dope solution is omitted for convenience.

The power source 109 has one terminal connected to the conveyor rollers 37, 39. The power source 109 has the other terminal connected to the counter electrode members 137, 139, 141, 143 provided in the upstream bath 131 of the dope bath 17. The electrode 1 is in contact with the conveyor rollers 37, 39. The electrode 1 and the counter electrode members 137, 139, 141, 143 are in the dope solution that is the electrolyte solution. Thus, in the upstream bath 131 of the dope bath 17, the electrode 1 and the counter electrode members 137, 139, 141, 143 are electrically connected through the electrolyte solution.

The power source 110 has one terminal connected to the conveyor rollers 43, 45. The power source 110 has the other terminal connected to the counter electrode members 137, 139, 141, 143 provided to the downstream bath 133 of the dope bath 17. The electrode 1 is in contact with the conveyor rollers 43, 45. The electrode 1 and the counter electrode members 137, 139, 141, 143 are in the dope solution that is the electrolyte solution. Thus, in the downstream bath 133 of the dope bath 17, the electrode 1 and the counter electrode members 137, 139, 141, 143 are electrically connected through the electrolyte solution.

The power source 111 has one terminal connected to the conveyor rollers 49, 51. The power source 111 has the other terminal connected to the counter electrode members 137, 139, 141, 143 provided to the upstream bath 131 of the dope bath 19. The electrode 1 is in contact with the conveyor rollers 49, 51. The electrode 1 and the counter electrode members 137, 139, 141, 143 are in the dope solution that is the electrolyte solution. Thus, in the upstream bath 131 of the dope bath 19, the electrode 1 and the counter electrode members 137, 139, 141, 143 are electrically connected through the electrolyte solution.

The power source 112 has one terminal connected to the conveyor rollers 55, 57. The power source 112 has the other terminal connected to the counter electrode members 137, 139, 141, 143 provided to the downstream bath 133 of the dope bath 19. The electrode 1 is in contact with the conveyor rollers 55, 57. The electrode 1 and the counter electrode members 137, 139, 141, 143 are in the dope solution that is the electrolyte solution. Thus, in the downstream bath 133 of the dope bath 19, the electrode 1 and the counter electrode members 137, 139, 141, 143 are electrically connected through the electrolyte solution.

The power source 113 has one terminal connected to the conveyor rollers 61, 63. The power source 113 has the other terminal connected to the counter electrode members 137, 139, 141, 143 provided to the upstream bath 131 of the dope bath 21. The electrode 1 is in contact with the conveyor rollers 61, 63. The electrode 1 and the counter electrode members 137, 139, 141, 143 are in the dope solution that is the electrolyte solution. Thus, in the upstream bath 131 of the dope bath 21, the electrode 1 and the counter electrode members 137, 139, 141, 143 are electrically connected through the electrolyte solution.

The power source 114 has one terminal connected to the conveyor rollers 67, 69. The power source 114 has the other terminal connected to the counter electrode members 137, 139, 141, 143 provided to the downstream bath 133 of the dope bath 21. The electrode 1 is in contact with the conveyor rollers 67, 69. The electrode 1 and the counter electrode members 137, 139, 141, 143 are in the dope solution that is the electrolyte solution. Thus, in the downstream bath 133 of the dope bath 21, the electrode 1 and the counter electrode members 137, 139, 141, 143 are electrically connected through the electrolyte solution.

The tab cleaner 117 cleans an end in a width direction W of the electrode 1. The collection unit 119 is arranged in each of the electrolyte solution treatment bath 15, the dope baths 17, 19, 21 and the cleaning bath 23. The collection unit 119 collects a liquid carried out from the bath by the electrode 1, and returns the liquid to the bath.

The end sensor 121 detects a position of the end in the width direction W of the electrode 1. An end position adjusting section that is not shown adjusts positions of the supply roll 101 and the wind-up roll 103 in the width direction W based on the detection result of the end sensor 121. The end position adjusting section adjusts the positions of the supply roll 101 and the wind-up roll 103 in the width direction W so that the end of the electrode 1 in the width direction W is adjusted to a position cleaned by the tab cleaner 117.

3. Composition of Dope Solution

When the electrode manufacturing system 11 is used, a dope solution is stored in the electrolyte solution treatment bath 15 and the dope baths 17, 19, 21. The dope solution includes an alkali metal ion and a solvent. The dope solution is the electrolyte solution.

Examples of the solvent may include an organic solvent. As the organic solvent, an aprotic organic solvent is preferable. Examples of the aprotic organic solvent may include ethylene carbonate, propylene carbonate, butylene carbonate, dimethyl carbonate, diethyl carbonate, methylethyl carbonate, 1-fluoroethylene carbonate, gamma-butyrolactone, acetonitrile, dimethoxyethane, tetrahydrofuran, dioxolane, methylene chloride, sulfolane, diethylene glycol dimethyl ether (diglyme), diethylene glycol methyl ethyl ether, trienthylene glycol dimethyl ether (triglyme), triethylene glycol butyl methyl ether, and tetraethylene glycol dimethyl ether (tetraglyme).

As the organic solvent, ionic liquid, such as quaternary imidazolium salt, quaternary pyridinium salt, quaternary pyrrolidinium salt, and quaternary piperidinium salt can be used. The organic solvent may be formed of a single component, or may be a mixed solvent formed of two or more types of components. The organic solvent may be formed of a single component, or may be a mixed solvent formed of two or more types of components.

The alkali metal ions contained in the dope solution are ions that make up an alkali metal salt. The alkali metal salt is preferably a lithium salt or a sodium salt. Examples of an anionic moiety making up the alkali metal salt may include a phosphorus anion having a fluoro group, such as $PF_6^-$, $PF_3(C_2F_5)_3^-$, and $PF_3(CF_3)_3^-$; a boron anion having a fluoro group or a cyano group, such as $BF_4^-$, $BF_2(CF)_2^-$, $BF_3(CF_3)^-$, $B(CN)_4^-$; a sulfonyl imide anion having a fluoro group, such as $N(FSO_2)_2{-}$, $N(CF_3SO_2)_2^-$, and $N(C_2F_5SO_2)_2^-$; and an organic sulfonic acid anion having a fluoro group, such as $CF_3SO_3^-$.

The concentration of the alkali metal salt in the dope solution is preferably 0.1 mol/L or higher, and more preferably within a range of 0.5 to 1.5 mol/L. When the concentration of the alkali metal salt is within this range, pre-doping with the alkali metal efficiently progresses.

The dope solution may further contain an additive, such as vinylene carbonate, vinyl ethylene carbonate, 1-fluoroethylene carbonate, 1-(trifluoromethyl) ethylene carbonate, succinic anhydride, maleic anhydride, propane sultone, and diethyl sulfone.

The dope solution may further contain a flame retardant, such as a phosphazene compound. From a viewpoint of effectively controlling a thermal runaway reaction when doping with the alkali metal, an amount of addition of the flame retardant is preferably 1 part by mass or more, and more preferably 3 parts by mass or more, and still more preferably 5 parts by mass or more with respect to 100 parts by mass of the dope solution. From a viewpoint of obtaining a high-quality doped electrode, an amount of addition of the flame retardant is preferably 20 parts by mass or less, more preferably 15 parts by mass or less, and still more preferably 10 parts by mass or less, with respect to 100 parts by mass of the dope solution.

4. Method for Manufacturing Electrode

First, as preparation for manufacturing the electrode 1, the following procedures are performed. The electrode precursor is wound around the supply roll 101. Next, the electrode precursor is drawn out from the supply roll 101, and is fed to the wind-up roll 103 along the above-mentioned path. Then, The electrolyte solution treatment bath 15, the dope baths 17, 19, 21 and the cleaning bath 23 are raised and set in place shown in FIG. 3.

The dope solution is stored in the electrolyte solution treatment bath 15 and the dope baths 17, 19, 21. The dope solution is a solution described in the above "3. Composition of Dope Solution". A cleaning liquid is stored in the cleaning bath 23. The cleaning liquid is an organic solvent.

Then, the electrode precursor and the electrode 1 are conveyed along the above-described path from the supply roll 101 to the wind-up roll 103 by the conveyer roller group. When the electrode precursor passes through the dope baths 17, 19, 21, the active material contained in the active material layer 5 is pre-doped with the alkali metal. As a result, the electrode 1 is manufactured. During pre-doping, in the dope baths 17, 19, 21, the electrode precursor and the counter electrode members are brought into contact with the dope solution containing the alkali metal ions.

The electrode 1 is cleaned in the cleaning bath 23 while being conveyed by the conveyer roller group. Then, the electrode 1 is wound around the wind-up roll 103. The electrode 1 may be a positive electrode or a negative electrode. In the case of manufacturing the positive electrode, the positive electrode active material is doped with the alkali metal in the electrode manufacturing system 11. In the case of manufacturing the negative electrode, the negative electrode active material is doped with the alkali metal in the electrode manufacturing system 11.

When lithium is occluded in the negative electrode active material of a lithium ion capacitor, the doping amount of the alkali metal is preferably 70 to 95% with respect to a theoretical capacity of the negative electrode active material. When lithium is occluded in the negative electrode active material of a lithium-ion rechargeable battery, the doping amount of the alkali metal is preferably 10 to 30% with respect to the theoretical capacity of the negative electrode active material.

EMBODIMENTS

Example 1

(i) Production of Electrode Precursor

A long strip shaped current collector 3 was prepared. In Example 1, the current collector 3 was a negative current collector. The size of the current collector 3 was 130 mm in width, 100 mm in length, and 8 µm in thickness. The surface roughness Ra of the current collector 3 was 0.1 µm. The current collector 3 was formed of copper foil. The current collector 3 has an active material layer 5 formed on each surface thereof. The active material layers 5 in Example 1 were negative electrode active material layers.

The coating weight of the active material layer 5 formed on one side of the current collector 3 was 100 g/m$^2$. The active material layers 5 were formed along a longitudinal direction of the current collector 3. The active material layers 5 were formed in one end of the current collector 3 in the width direction so as to extend 120 mm in width. Active material layer unformed portions in the other end of the current collector 3 in the width direction W were 10 mm in width. The active material layer unformed portions are portions in which the active material layers 5 are not formed. After drying and pressing, an electrode precursor was obtained.

The active material layer 5 contained a negative electrode active material, carboxymethyl cellulose, acetylene black, a binder and a dispersing agent in the mass ratio of 88:3:5:3:1. The negative electrode active material was a mixture of a Si-based active material and a graphite-based active material. The negative electrode active material included the Si-based active material and the graphite system active material in the mass ratio of 2:8.

(ii) Production of Counter Electrode Member

A resin film was attached to a copper plate. The size of the copper plate was 1000 mm in length, 220 mm in width, and 3 mm in thickness. The size of the resin film was 810 mm in length, 120 mm in width, and 470 µm in thickness. The resin film had a grid shape as shown in FIG. 7 and FIG. 6. The aperture ratio of the resin film was 50%. The material of the resin film was polypropylene.

A Li foil was attached on the resin film. The length and the width of the Li foil were the same as the resin film. The thickness of the Li foil was 2 mm. The resin film was located between the copper plate and the Li foil. The copper plate corresponds to the conductive base material. The resin film corresponds to a member having an opening. The Li foil corresponds to an alkali metal-containing plate.

A stacked body formed of the copper plate, resin film, and the Li foil was pressed using a roll press device under the condition of a linear pressure of 5 kgf/cm. As a result, the Li foil was pressure-bonded through the resin film to the copper plate. Finally, resin masks made of polypropylene (PP) were arranged on both ends of the Li foil. The Li foil was covered with the resin masks in a range of 5 mm from each end of the Li foil. As a result, in the Li foil, a portion facing the electrode precursor had a width of 110 mm. Through the above processes, the counter electrode members 137, 139, 141, 143 were prepared.

Figure 8:
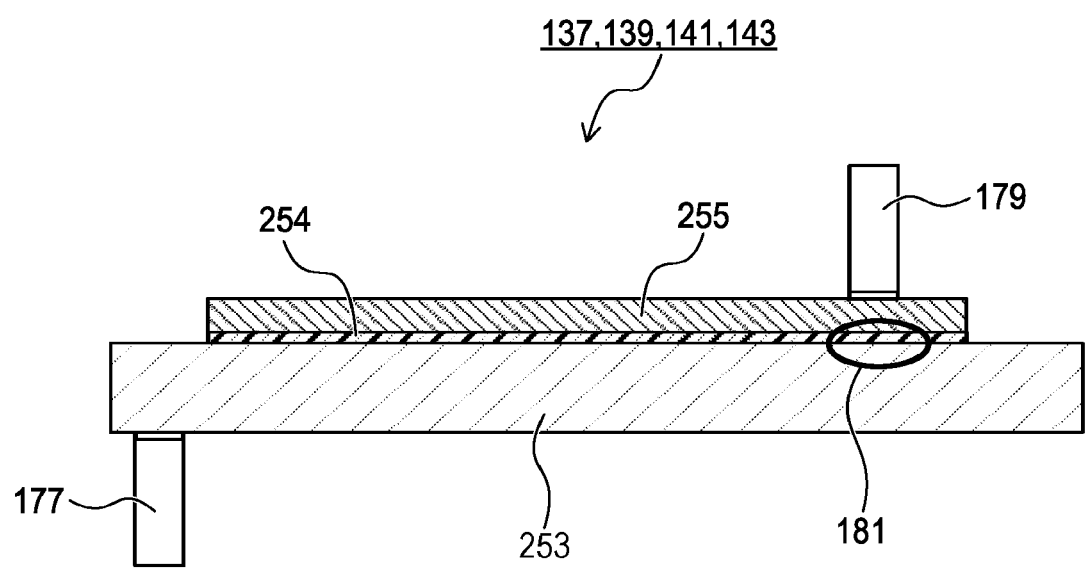
FIG. 8 is an explanatory diagram showing a method for measuring a resistance value r1.

An interface resistance value between the copper plate and the Li foil in each of the counter electrode members 137, 139, 141, 143 was measured. For the measurement, 3560 AC mΩ HiTESTER manufactured by Hioki E.E. Corporation was used. As shown in FIG. 8, a first measuring terminal 177 was brought into contact with a copper plate 253 of each of the counter electrode members 137, 139, 141, 143. The contact area of the copper plate 253 with the first measuring terminal 177 was 5 mm$^2$. Also, a second measuring terminal 179 was brought into contact with a Li foil 255. The contact area of the Li foil 255 with the second measuring terminal 179 was 5 mm$^2$. In a length direction of each of the counter electrode members 137, 139, 141, 143, the first measuring terminal 177 and the second measuring terminal 179 were not aligned. Between the copper plate 253 and the Li foil 255, a resin film 254 was arranged. A resistance value measured in a state shown in FIG. 8 is referred to as "r1". The "r1" is the sum of a resistance value of the Li foil 255, an interface resistance value of an interface 181 shown in FIG. 8, and a resistance value of the copper plate 253. The interface 181 is an interface between the copper plate 253 and the Li foil 255 facing each other across the resin film 254.

Figure 9:
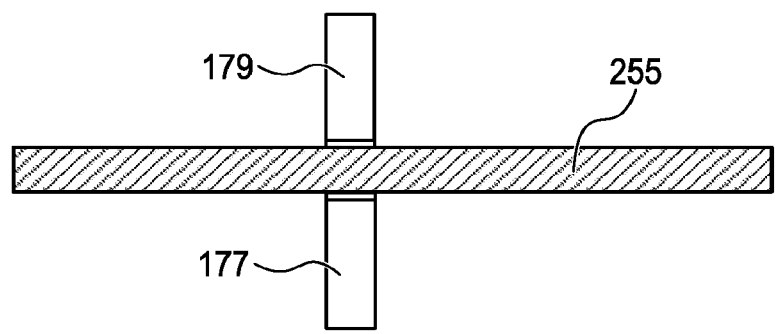
FIG. 9 is an explanatory diagram showing a method for measuring a resistance value r2.

As shown in FIG. 9, the first measuring terminal 177 was brought into contact with one surface of the Li foil 255. The contact area of the Li foil 255 with the first measuring terminal 177 was 5 mm². The second measuring terminal 179 was brought into contact with the other opposite surface of the Li foil 255. The contact area of the Li foil 255 with the second measuring terminal 179 was 5 mm². A resistance value measured in a state shown in FIG. 9 is referred to as "r2". The "r2" is a resistance value of only the Li foil 255.

Figure 10:
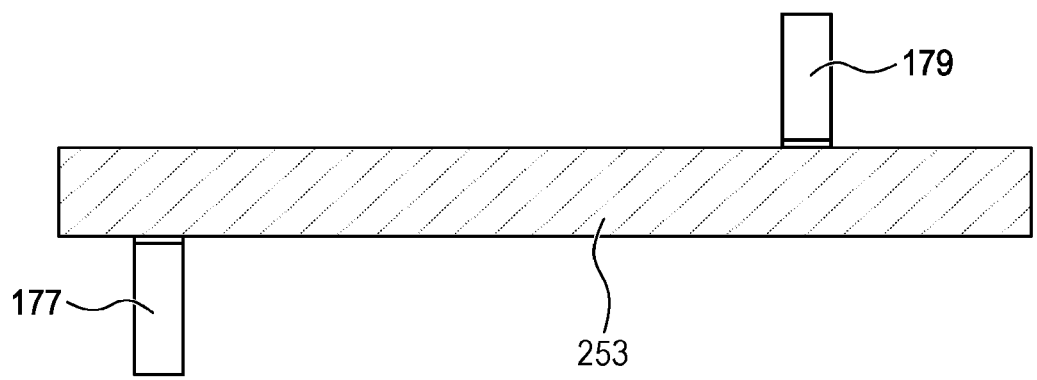
FIG. 10 is an explanatory diagram showing a method for measuring a resistance value r3.

As shown in FIG. 10, the first measuring terminal 177 was brought into contact with one surface of the copper plate 253. The contact area of the copper plate 253 with the first measuring terminal 177 was 5 mm². The second measuring terminal 179 was brought into contact with the other opposite surface of the copper plate 253. The contact area of the copper plate 253 with the second measuring terminal 179 was 5 mm². In a length direction of the copper plate 253, the first measuring terminal 177 and the second measuring terminal 179 were not aligned as in the case of FIG. 8. A resistance value measured in a state shown in FIG. 10 is referred to as "r3". The "r3" is a resistance value of only the copper plate 253.

The interface resistance value in the interface 181 was calculated by deducting r2 and r3 from r1. The interface resistance value was 1.1 mΩ. Thus, it was confirmed that the conductivity between the copper plate 253 and the Li foil 255 was good.

Based on the interface resistance value, power feed contact was evaluated. Evaluation criteria for the power feed contact are as follows.

A: The interface resistance value is 20 mΩ or less.

B: The interface resistance value is more than 20 mΩ and 100 mΩ or less.

C: The interface resistance value is more than 100 mΩ.

In Example 1, the evaluation result was "A". The evaluation results are shown in Table 1.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Opening member | Material |  |  |  |  | PP |  |  |  |  |
|  | Thickness (μm) |  | 470 |  | 20 | 1500 |  |  | 470 |  |
|  | Aperture ratio (%) |  |  | 50 |  |  | 1 | 2 | 60 | 80 |
|  | Opening shape |  |  |  |  | Grid |  |  |  |  |
| Linear pressure during pressing (kgf/cm) |  | 5 | 20 | — | 5 | 5 | 5 | 5 | 5 | 5 |
| Surface pressure during pressing (kgfcm²) |  | — |  | 1 |  |  |  |  | — |  |
| Liquid flow rate of dope solution (cm/sec) |  |  |  |  |  | 0.2 |  |  |  |  |
| Peeling evaluation |  | A | B | A | B | A | A | A | A | B |
| Li residue (visual observation) |  | None | In places | None | In places | None | None | None | None | In places |
| power feed contact |  | A | B | A | B | B |  |  | A |  |
| Interface resistance value (mΩ) |  | 1.1 | 47.1 | 1.1 | 49.3 | 48.2 | 11.2 |  | 1.1 |  |
| Dope evaluation |  |  | A |  |  | B | B |  | A |  |
| Voltage rise |  |  |  |  |  | None |  |  |  |  |
| Stable voltage (V) |  | 3.02 | 3.47 | 3.02 | 3.53 | 3.49 | 3.14 |  | 3.02 |  |

|  |  | Example 10 | Example 11 | Example 12 | Example 13 | Example 14 | Comparative Example 1 | Comparative Example 2 |
|---|---|---|---|---|---|---|---|---|
| Opening member | Material |  | PP |  | Metal 1 (porous nickel) | Metal 2 (porous titanium) | — | PP |
|  | Thickness (μm) | 380 |  |  | 470 |  | — | 470 |
|  | Aperture ratio (%) | 80 |  |  | 50 |  | — | 0 |
|  | Opening shape | Grid | Pore |  | Grid |  | — | No opening |
| Linear pressure during pressing (kgf/cm) | | 3 | 5 | 5 | 5 | 5 | 5 | 5 |
| Surface pressure during pressing (kgfcm²) |  |  |  |  | — |  |  |  |
| Liquid flow rate of dope solution (cm/sec) |  | 0.2 |  | 2.5 |  |  | 0.2 |  |
| Peeling evaluation |  | A | B | A | B | B | C | A |
| Li residue (visual observation) |  | None | In places | None | In places | In places | Wide area | None |
| power feed contact |  |  |  | A |  |  |  | C |
| Interface resistance value (mΩ) |  |  |  | 1.1 |  |  |  | Upper limit of the device |
| Dope evaluation |  |  | A | AA |  | A |  | — |
| Voltage rise |  |  |  | None |  |  |  | — |
| Stable voltage (V) |  |  | 3.02 | 2.63 |  | 3.02 |  | — |

(iii) Manufacture of Electrode

The electrode manufacturing system 11 shown in FIG. 3 was prepared, and an electrode precursor was fed therethrough. The counter electrode members 137, 139, 141, 143 produced in the above (ii) were arranged in each of the dope baths 17, 19, 21. Then, a dope solution is stored in the electrolyte solution treatment bath 15 and the dope baths 17, 19, 21. The dope solution was a solution containing 1.4 M of $LiPF_6$. The solvent of the dope solution was a liquid mixture containing EC (ethylene carbonate), EMC (ethylmethyl carbonate) and DMC (dimethyl carbonate) in the volume ratio of 1:1:1.

Then, the pump 163 was started, and the dope solution was circulated in each of the respective dope baths 17, 19, 21. The flow velocity of the dope solution was 0.2 cm/sec in the dope baths 17, 19, 21. In the dope baths 17, 19, 21, the dope solution flowed substantially parallel to the surface of the electrode precursor.

Then, the electrode precursor and the counter electrode members 137, 139, 141, 143 were connected to a direct current power source having an electric current and voltage monitor. Then, while the electrode precursor was being conveyed at a speed of 1.24 m/min, an electric current of 154 A was conducted in the entire electrode manufacturing system 11. This process corresponds to pre-doping. At this time, a pre-doping current density was 10 $mA/cm^2$ per one side. The pre-doping current density is an amount of a pre-doping electric current flowing through the electrode precursor per unit area.

When the electrode precursor was being conveyed, the center of the active material layer 5 of the electrode precursor in the width direction W coincided with the center of the Li foil in the width direction W of each of the counter electrode members 137, 139, 141, 143.

During pre-doping, a dope evaluation was carried out. The dope evaluation is an evaluation regarding the likelihood of voltage rise during pre-doping. Evaluation criteria for the dope evaluation are as follows.

AA: A stable voltage during pre-doping is less than 3.0 V.
A: The stable voltage is 3.0 V or more and less than 3.3 V.
B: The stable voltage is 3.3 V or more and less than 3.6 V.
C: A voltage is 3.6 V or more regardless of whether or not the voltage is stable during pre-doping Note that the stable voltage refers to a voltage when a voltage change becomes ±0.05 V or less after pre-doping is started. In Example 1, the evaluation result of the dope evaluation was rated "A", and the stable voltage was 3.02 V. In Example 1, the voltage did not continuously increase during pre-doping. The evaluation results are shown in Table 1.

The electrode 1 was wound up after passing through the cleaning bath 23. In the cleaning bath 23, DMC (dimethyl carbonate) at 25° C. was stored. Accordingly, a pre-doped electrode 1 was manufactured.

(iv) Replacement of Li Foil

After pre-doping, the counter electrode members 137, 139, 141, 143 were removed from the electrode manufacturing system 11. An edge of the Li foil was peeled from the copper plate using a spatula. Then, a part of the Li foil peeled from the copper plate was pulled, whereby the entire Li foil was peeled from the copper plate. After peeling, the surface of the copper plate was visually observed. A peeling evaluation was carried out based on the following criteria.

A: Almost no Li residue was observed on the copper plate after peeling.
B: Li residue was observed in places on the copper plate after peeling.
C: Li residue was observed over a wide area on the copper plate after peeling.

The results of the peeling evaluation are shown in Table 1. The evaluation result of Example 1 was rated "A". Thus, the replacement workability of the Li foil was good.

Example 2

Basically, the production of the electrode precursor, the production of the counter electrode member, the production of the electrode 1, and the replacement of the Li foil were carried out in the same way as Example 1. However However, the linear pressure when pressing the stacked body formed of the copper plate, the resin film, and the Li foil was 20 kgf/cm.

The evaluations were carried out in the same way as Example 1. The evaluation results are shown in Table 1. The interface resistance value was 1.1 mΩ. Thus, it was confirmed that the conductivity between the copper plate and the Li foil was good. The voltage did not continuously increase during pre-doping. The stable voltage was 3.02 V.

When the Li foil was peeled from the copper plate, the Li foil broke in the middle of the process, leaving residues of the Li foil in places on the copper plate. The reason for this is considered that the copper plate and the Li foil are excessively strongly pressure-bonded due to the high linear pressure when pressing.

Example 3

Basically, the production of the electrode precursor, the production of the counter electrode member, the production of the electrode 1, and the replacement of the Li foil were carried out in the same way as Example 1. However, a flat press method was used when pressing the stacked body formed of the copper plate, the resin film, and the Li foil. The press pressure in the flat press was 1 $kgf/cm^2$.

The evaluations were carried out in the same way as Example 1. The evaluation results are shown in Table 1. The interface resistance value was 47.1 mΩ. Thus, compared to Example 1, the conductivity between the copper plate and the Li foil was insufficient.

The voltage did not continuously increase during predoping. The stable voltage was 3.47 V. It is considered that the stable voltage was increased due to the interface resistance value larger than that of Example 1. After the Li foil was peeled from the copper plate, almost no Li foil remained on the copper plate.

Example 4

Basically, the production of the electrode precursor, the production of the counter electrode member, the production of the electrode 1, and the replacement of the Li foil were carried out in the same way as Example 1. However, the thickness of the resin film included in the counter electrode member was 20 μm.

The evaluations were carried out in the same way as Example 1. The evaluation results are shown in Table 1. The interface resistance value was 1.1 mΩ. Thus, it was confirmed that the conductivity between the copper plate and the Li foil was good. The voltage did not continuously increase during pre-doping. The stable voltage was 3.02 V.

When the Li foil was peeled from the copper plate, the Li foil broke in the middle of the process, leaving residues of the Li foil in places on the copper plate. The reason for this is considered that the copper plate and the Li foil were strongly pressure-bonded in comparison with Example 1 due to the small thickness of the resin film.

Example 5

Basically, the production of the electrode precursor, the production of the counter electrode member, the production of the electrode 1, and the replacement of the Li foil were carried out in the same way as Example 1. However, the thickness of the resin film included in the counter electrode member was 1500 μm.

The evaluations were carried out in the same way as Example 1. The evaluation results are shown in Table 1. The interface resistance value was 49.3 mΩ. Thus, compared to Example 1, the conductivity between the copper plate and the Li foil was insufficient. The reason for this is considered that the pressure bonding property between the copper plate and the Li foil was decreased due to the large thickness of the resin film.

The voltage did not continuously increase during pre-doping. The stable voltage was 3.53 V. It is considered that the stable voltage was increased due to the interface resistance value larger than that of Example 1. After the Li foil was peeled from the copper plate, almost no Li foil remained on the copper plate.

Example 6

Basically, the production of the electrode precursor, the production of the counter electrode member, the production of the electrode 1, and the replacement of the Li foil were carried out in the same way as Example 1. However, the aperture ratio of the resin film included in the counter electrode member was 1%.

The evaluations were carried out in the same way as Example 1. The evaluation results are shown in Table 1. The interface resistance value was 48.2 mΩ. Thus, compared to Example 1, the conductivity between the copper plate and the Li foil was insufficient. The voltage did not continuously increase during pre-doping. The stable voltage was 3.49 V.

It is considered that the stable voltage was increased due to the interface resistance value larger than that of Example 1. After the Li foil was peeled from the copper plate, almost no Li foil remained on the copper plate.

Example 7

Basically, the production of the electrode precursor, the production of the counter electrode member, the production of the electrode 1, and the replacement of the Li foil were carried out in the same way as Example 1. However, the aperture ratio of the resin film included in the counter electrode member was 2%.

The evaluations were carried out in the same way as Example 1. The evaluation results are shown in Table 1. The interface resistance value was 11.2 mΩ. Although the interface resistance value in Example 7 was slightly increased compared to that in Example 1, the conductivity between the copper plate and the Li foil was good. The voltage did not continuously increase during pre-doping. The stable voltage was 3.14 V.

The reason for the slight increase in the stable voltage compared to that in Example 1 is considered that the conductivity between the copper plate and the Li foil decreased compared to Example 1. After the Li foil was peeled from the copper plate, almost no Li foil remained on the copper plate.

Example 8

Basically, the production of the electrode precursor, the production of the counter electrode member, the production of the electrode 1, and the replacement of the Li foil were carried out in the same way as Example 1. However, the aperture ratio of the resin film included in the counter electrode member was 60%.

The evaluations were carried out in the same way as Example 1. The evaluation results are shown in Table 1. The interface resistance value was 1.1 ma Thus, the conductivity between the copper plate and the Li foil was good. The voltage did not continuously increase during pre-doping. The stable voltage was 3.02 V.

It is considered that the stable voltage was increased due to the interface resistance value larger than that of Example 1. After the Li foil was peeled from the copper plate, almost no Li foil remained on the copper plate.

Example 9

Basically, the production of the electrode precursor, the production of the counter electrode member, the production of the electrode 1, and the replacement of the Li foil were carried out in the same way as Example 1. However, the aperture ratio of the resin film included in the counter electrode member was 80%.

The evaluations were carried out in the same way as Example 1. The evaluation results are shown in Table 1. The interface resistance value was 1.1 ma Thus, the conductivity between the copper plate and the Li foil was good. The voltage did not continuously increase during pre-doping. The stable voltage was 3.02 V.

When the Li foil was peeled from the copper plate, the Li foil broke in the middle of the process, leaving residues of the Li foil in places on the copper plate. The reason for this is considered that the copper plate and the Li foil was excessively strongly pressure-bonded due to the aperture ratio larger than that of Example 1.

Example 10

Basically, the production of the electrode precursor, the production of the counter electrode member, the production of the electrode 1, and the replacement of the Li foil were carried out in the same way as Example 1. However, the thickness of the resin film included in the counter electrode member was 380 μm.

In addition, the linear pressure when pressing the stacked body formed of the copper plate, the resin film, and the Li foil was 3 kgf/cm.

The evaluations were carried out in the same way as Example 1. The evaluation results are shown in Table 1. The interface resistance value was 1.1 mΩ. Thus, the conductivity between the copper plate and the Li foil was good. The voltage did not continuously increase during pre-doping. The stable voltage was 3.02 V.

The aperture ratio in Example 10 was the same as that in Example 9. However, since the line pressure when pressing the stacked body was smaller than the line pressure in Example 9, almost no Li foil remained on the copper plate after the Li foil was peeled from the copper plate.

Example 11

Basically, the production of the electrode precursor, the production of the counter electrode member, the production of the electrode 1, and the replacement of the Li foil were carried out in the same way as Example 1. However, the form of the resin film included in the counter electrode member was as follows. The resin film had multiple circular holes. The diameter of each hole was 800 μm. The pitch between the holes was 1.0 mm. The arrangement pattern of the multiple holes was a staggered punching pattern. The multiple holes correspond to the openings.

The evaluations were carried out in the same way as Example 1. The evaluation results are shown in Table 1. The interface resistance value was 1.1 mΩ. Thus, the conductivity between the copper plate and the Li foil was good. The voltage did not continuously increase during pre-doping. The stable voltage was 3.02V.

When the Li foil was peeled from the copper plate, the Li foil broke in the middle of the process, leaving residues of the Li foil in places on the copper plate. The reason for this is considered that the shape of the opening in the resin film was different from that of the resin film in Example 1.

Example 12

Basically, the production of the electrode precursor, the production of the counter electrode member, the production of the electrode 1, and the replacement of the Li foil were carried out in the same way as Example 1. However, the liquid flow rate of the dope solution in the dope baths 17, 19, 21 during pre-doping was 2.5 cm/sec.

The evaluations were carried out in the same way as Example 1. The evaluation results are shown in Table 1. The interface resistance value was 1.1 mΩ. Thus, the conductivity between the copper plate and the Li foil was good. The voltage did not continuously increase during pre-doping. The stable voltage was 2.63 V. The reason for the decrease in the stable voltage compared to that in Example 1 is considered that a liquid resistance of the dope solution was decreased due to the large liquid flow rate of the dope solution. After the Li foil was peeled from the copper plate, almost no Li foil remained on the copper plate.

Example 13

Basically, the production of the electrode precursor, the production of the counter electrode member, the production of the electrode 1, and the replacement of the Li foil were carried out in the same way as Example 1. However, the counter electrode member included a below-described opening member instead of the resin film. The opening member was made of porous nickel. The opening member had an oxide film having a thickness of about 30 angstroms formed on the surface thereof. The nickel is referred to as Metal 1 in Table 1. The thickness and the aperture ratio of the opening member were the same as those of the resin film in Example 1. The opening member was a member having a grid shape as in the case of the resin film in Example 1.

The evaluations were carried out in the same way as Example 1. The evaluation results are shown in Table 1. The interface resistance value was 1.1 mΩ. Thus, the conductivity between the copper plate and the Li foil was good. The voltage did not continuously increase during pre-doping. The stable voltage was 3.02 V.

When the Li foil was peeled from the copper plate, the Li foil broke in the middle of the process, leaving residues of the Li foil in places on the copper plate. The reason for this is considered that the opening member is different from that in Example 1.

Example 14

Basically, the production of the electrode precursor, the production of the counter electrode member, the production of the electrode 1, and the replacement of the Li foil were carried out in the same way as Example 1. However, the counter electrode member included a below-described opening member instead of the resin film. The opening member was made of porous titanium. The opening member had an oxide film having a thickness of about 50 angstroms formed on the surface thereof. Titanium corresponds to metals. Titanium is referred to as Metal 2 in Table 1. The thickness and the aperture ratio of the opening member were the same as those of the resin film in Example 1. The opening member was a member having a grid shape as in the case of the resin film in Example 1.

The evaluations were carried out in the same way as Example 1. The evaluation results are shown in Table 1. The interface resistance value was 1.1 mat. Thus, the conductivity between the copper plate and the Li foil was good. The voltage did not continuously increase during pre-doping. The stable voltage was 3.02 V.

When the Li foil was peeled from the copper plate, the Li foil broke in the middle of the process, leaving residues of the Li foil in places on the copper plate. The reason for this is considered that the opening member is different from that in Example 1.

Comparative Example 1

Basically, the production of the electrode precursor, the production of the counter electrode member, the production of the electrode 1, and the replacement of the Li foil were carried out in the same way as Example 1. However, the counter electrode member did not include the resin film.

The evaluations were carried out in the same way as Example 1. The evaluation results are shown in Table 1. The interface resistance value was 1.1 mΩ. Thus, the conductivity between the copper plate and the Li foil was good. The voltage did not continuously increase during pre-doping. The stable voltage was 3.02 V.

When the Li foil was peeled from the copper plate, the Li foil broke in the middle of the process, leaving a residue of the Li foil over a wide area on the copper plate.

Comparative Example 2

An attempt was made to produce the counter electrode member in the same way as Example 1 except that a polypropylene resin film without openings were used in the production of the counter electrode member. However, the Li foil did not adhere to the copper plate and immediately peeled off from the copper plate.

The evaluations were carried out in the same way as Example 1. The evaluation results are shown in Table 1. The interface resistance value was higher than the measuring upper limit of the measuring device. As described above, since the Li foil did not adhere to the copper plate, it was unable to arrange the counter electrode members to the device, and thus, it was unable to perform pre-doping.

Other Embodiments

Some embodiments of the present disclosure have been described; however, the present disclosure may be embodied in various forms without limited to the above-described embodiments (1) A function of one element in each of the above-described embodiments may be shared by multiple elements, and functions of multiple elements may be performed by one element. A part of the elements in the above-described embodiments may be omitted. At least a part of the elements in the above-described embodiments may be added to and/or replaced with another element in the above-described embodiments.

(2) The present disclosure can also be practiced in various forms, other than the above-described method for manufacturing an electrode. Examples of such forms may include an electrode manufacturing system, a program to functionalize a computer as a control unit of the electrode manufacturing system, a non-transitory tangible storage medium, such as a semiconductor, storing the program, and a doping method.

The invention claimed is:

1. A method for manufacturing an electrode by doping an active material included in a layer of an electrode precursor with alkali metal, the method comprising:

bringing the electrode precursor and a counter electrode member into contact with a solution containing an alkali metal ion in a dope bath, wherein the counter electrode member comprises a conductive base material, a plate comprising an alkali metal, and a member having an opening, wherein the member having an opening is located between the conductive base material and the alkali metal-containing plate.

2. The method according to claim 1, wherein the member having the opening is a resin film having an opening.

3. The method according to claim 1, wherein the electrode precursor has a strip shape, and wherein the electrode precursor is conveyed by a conveyor roller along a path passing through the dope bath.

4. The method according to claim 1, wherein an aperture ratio of the member having the opening is from 2% to 85%.

5. The method according to claim 1, wherein the member having the opening has a grid shape.

6. The method according to claim 1, wherein in the dope bath, the solution comprising the alkali metal ion is flowed substantially parallel to a surface of the electrode precursor.

* * * * *